(12) United States Patent
Koga (10) Patent No.: US 9,752,673 B2
(45) Date of Patent: Sep. 5, 2017

(54) BAFFLE PLATE FOR DIFFERENTIAL DEVICE (71) Applicant: NIFCO INC., Yokosuka-shi, Kanagawa (JP)

(72) Inventor: Toru Koga, Yokosuka (JP)

(73) Assignee: NIFCO INC., Yokosuka-shi, Kanagawa (JP)

(*) Notice: Subject to any disclaimer, the term of this patent is extended or adjusted under 35 U.S.C. 154(b) by 0 days.

(21) Appl. No.: 15/127,626

(22) PCT Filed: Mar. 19, 2015

(86) PCT No.: PCT/JP2015/058264
§ 371 (c)(1),
(2) Date: Sep. 20, 2016

(87) PCT Pub. No.: WO2015/141783
PCT Pub. Date: Sep. 24, 2015

(65) Prior Publication Data
US 2017/0130816 A1    May 11, 2017

(30) Foreign Application Priority Data

Mar. 20, 2014 (JP) ................................. 2014-057420

(51) Int. Cl.
F16H 57/04    (2010.01)
F16J 15/10    (2006.01)

(52) U.S. Cl.
CPC ..... *F16H 57/0421* (2013.01); *F16H 57/0454* (2013.01); *F16H 57/0457* (2013.01); *F16H 57/0483* (2013.01); *F16J 15/102* (2013.01)

(58) Field of Classification Search
None
See application file for complete search history.

(56) References Cited

U.S. PATENT DOCUMENTS

| 5,050,447 A | 9/1991 | Hayakawa et al. |
| 9,638,313 B2* | 5/2017 | Steward .............. F16H 57/0423 |
| 2005/0107202 A1 | 5/2005 | Min |
| 2006/0060424 A1 | 3/2006 | Tominaga et al. |
| 2007/0169583 A1 | 7/2007 | Reis et al. |

(Continued)

FOREIGN PATENT DOCUMENTS

| JP | S52-163820 U | 12/1977 |
| JP | S63-152964 U | 10/1988 |

(Continued)

OTHER PUBLICATIONS

PCT International Search Report of PCT/JP2015/058264 dated Jun. 9, 2015.

(Continued)

*Primary Examiner* — Dirk Wright
(74) *Attorney, Agent, or Firm* — Manabu Kanesaka (57) ABSTRACT A baffle plate for a differential device disposed inside a differential case, includes a baffle plate main member made of synthetic resin and adapted to be disposed on one lateral side of a ring gear in the differential device; and an elastically deformable seal member attached to an outer peripheral edge portion of the baffle plate main member and adapted to contact a bottom wall portion of the differential case.

8 Claims, 8 Drawing Sheets (56) References Cited

U.S. PATENT DOCUMENTS

| | | |
|---|---|---|
| 2010/0029430 A1 | 2/2010 | Tokai et al. |
| 2012/0222517 A1 | 9/2012 | Okuta et al. |
| 2016/0076636 A1 | 3/2016 | Kito et al. |

FOREIGN PATENT DOCUMENTS

| | | |
|---|---|---|
| JP | H04-136559 A | 5/1992 |
| JP | H07-315147 A | 12/1995 |
| JP | 2591672 B2 | 3/1997 |
| JP | 2605710 B2 | 4/1997 |
| JP | 2825820 B2 | 11/1998 |
| JP | H11-51160 A | 2/1999 |
| JP | 2003-269586 A | 9/2003 |
| JP | 2005-140321 A | 6/2005 |
| JP | 2006-090350 A | 4/2006 |
| JP | 2006-275164 A | 10/2006 |
| JP | 2007-514905 A | 6/2007 |
| JP | 2008-196626 A | 8/2008 |
| JP | 2008-232357 A | 10/2008 |
| JP | 2009-074370 A | 4/2009 |
| JP | 2010-099646 A | 5/2010 |
| JP | 2011-000944 A | 1/2011 |
| JP | 2012-031794 A | 2/2012 |
| JP | 2012-180897 A | 9/2012 |
| JP | 5429364 B2 | 2/2014 |
| JP | 2014-190529 A | 10/2014 |
| WO | 2014/017301 A1 | 1/2014 |
| WO | 2014/208160 A1 | 12/2014 |

OTHER PUBLICATIONS

Japan Patent Office, "Submission for Japanese Patent Application No. 2014-57420," Jun. 19, 2017.

\* cited by examiner

BAFFLE PLATE FOR DIFFERENTIAL DEVICE

CROSS-REFERENCES TO RELATED APPLICATIONS

The present application is National Phase of International Application No. PCT/JP2015/058264 filed Mar. 19, 2015, and claims priority from Japanese Patent Application No. 2014-057420, filed on Mar. 20, 2014, the disclosure of which is hereby incorporated by reference herein in its entirety.

FIELD OF TECHNOLOGY

The present invention relates to a baffle plate for a differential device.

BACKGROUND ART

The differential device includes a ring gear; a holding case integrally rotated with the ring gear; a pinion shaft held in the holding case; a pinion gear held in the pinion shaft; and a side gear engaged with the pinion gear and integrated with a drive shaft, inside a differential case. In such a differential device, lubricating oil reserved inside the differential case is scooped up by the ring gear which has the largest diameter to perform lubrication of each engagement portion or a rotation portion.

In order to control a flow of the lubricating oil inside the differential case, to reduce a stirring resistance of the lubricating oil, and the like, there is provided a baffle plate inside the differential case. In Patent Document 1, there is disclosed a differential device reducing the stirring resistance using the baffle plate surrounding one portion of a rotational member and including a seal member contacting an inner face of the differential case.

PRIOR ART DOCUMENT

Patent Document

Patent Document 1: Japanese Unexamined Patent Application Publication No. 2006-90350

SUMMARY OF THE INVENTION

Problems to be Solved by the Invention

In order to reduce the stirring resistance, however, it can be considered that an oil level of the lubricating oil inside the differential case is lowered. However, in that case, it becomes difficult to sufficiently reserve the lubricating oil inside the differential case. Consequently, it can be considered that the baffle plate is disposed on a lateral side of one side of the ring gear to divide a lower portion inside the differential case by the baffle plate into a first chamber where the ring gear is positioned and a second chamber on a side opposite to the first chamber by sandwiching the ring gear. Thereby, even if a large amount of lubricating oil is reserved inside the differential case, the lubricating oil scooped up by the rotating ring gear flows to the second chamber through an upper space of the first chamber and the second chamber, and an oil level of the lubricating oil in the second chamber becomes higher than an oil level in the first chamber so as to reduce the stirring resistance by lowering the oil level in the first chamber.

As mentioned above, in a case wherein the lower portion inside the differential case is divided into the first chamber and the second chamber by the baffle plate, it is necessary to prevent the large amount of lubricating oil from flowing from the second chamber to the first chamber through a gap between an outer peripheral edge portion of the baffle plate and a bottom wall portion of the differential case. Consequently, it can be considered to attach the seal member, contacting the bottom wall portion of the differential case, to the outer peripheral edge portion of the baffle plate.

In a case wherein the seal member is attached to the outer peripheral edge portion of the baffle plate, in the Patent Document 1, a separate seal insertion plate is fused to a baffle plate main member so as to fix the seal member to the seal insertion plate.

However, it is necessary for an operation of providing the separate seal insertion plate in addition to the baffle plate main member and the seal member, or fusing the seal insertion plate to the baffle plate main member, so that it becomes undesirable in terms of a cost. Also, a degree of freedom in shape becomes low so as to become difficult to dispose the seal member at an intended portion.

The present invention is made in view of the aforementioned circumstances, and an object of the present invention is to provide a baffle plate for a differential device with a high degree of freedom in shape at a low cost, and an excellent seal property.

Means for Solving the Problems

In order to obtain the aforementioned object, the present invention is a baffle plate for a differential device disposed inside a differential case, and provides the baffle plate formed by a baffle plate main member made of synthetic resin and disposed on one lateral side of a ring gear in the differential device; and an elastically deformable seal member attached to an outer peripheral edge portion of the baffle plate main member and adapted to contact a bottom wall portion of the differential case. According to the present invention, in the baffle plate disposed inside the differential device, the baffle plate main member which becomes a large size member is made of synthetic resin so as to have a high degree of freedom in shape, and be manufactured at a low cost. Also, due to the elastically deformable seal member attached to the baffle plate main member, reliable sealing can be carried out so as to effectively reduce a rotational resistance.

Preferably, the seal member is made of elastically deformable synthetic resin. In that case, molding of the seal member is simplified, and the seal member can be manufactured at the low cost.

Preferably, there is formed a fitting hole in any one of the outer peripheral edge portion of the baffle plate main member and the seal member, and there is formed a locking claw portion engaging the fitting hole in the other. Also, preferably, the locking claw portion fits into the fitting hole, so that the baffle plate main member and the seal member are integrated. In that case, the baffle plate main member and the seal member can be simply and reliably integrated using the fitting hole and the locking claw portion.

Preferably, the locking claw portion is elastically deformable. In that case, the locking claw portion can easily fit into the fitting hole further.

Preferably, in the seal member, there is formed a concave groove into which the outer peripheral edge portion of the baffle plate main member fits. In that case, it becomes preferable for preventing the seal member from falling relative to the baffle plate main member, i.e. preventing the seal member from inclining from a desired positional state and reliably securing a seal property further.

Preferably, the seal member includes a lip portion, and an extending direction of a tip portion of the lip portion is set to become a direction opposite to the ring gear. In that case, it becomes preferable for preventing the seal member from falling by receiving a high oil pressure produced when the ring gear rotates while enhancing the seal property by the lip portion. Also, it becomes preferable for reducing a sliding resistance as well when the baffle plate main member wherein the seal member is assembled is inserted into the differential case while sliding the lip portion on an inner face of the differential case.

Preferably, the baffle plate main member includes a radial-direction wall portion disposed along a radial direction of the ring gear; and a halved cylindrical portion extending in an axial direction of the ring gear from an inner peripheral edge portion of the radial-direction wall portion, and there is attached another seal member adapted to contact the inner face of the differential case at a tip portion of the halved cylindrical portion. In that case, it becomes preferable for performing reliable lubrication of lubricating oil which has lubricated a gear located directly above the halved cylindrical portion, a rotation portion, or the like to a necessary portion by returning the aforementioned lubricating oil again to a side where the ring gear is positioned.

Preferably, the baffle plate main member and the seal member are formed by injection molding with two-color molding. In that case, molding of the baffle plate main member, molding of the seal member, and an integration of the baffle plate main member and the seal member can be carried out at once.

Effect of the Invention

According to the present invention, the baffle plate with the high degree of freedom in shape at the low cost, and an excellent seal property can be provided.

BEST MODES OF CARRYING OUT THE INVENTION

Figure 1:
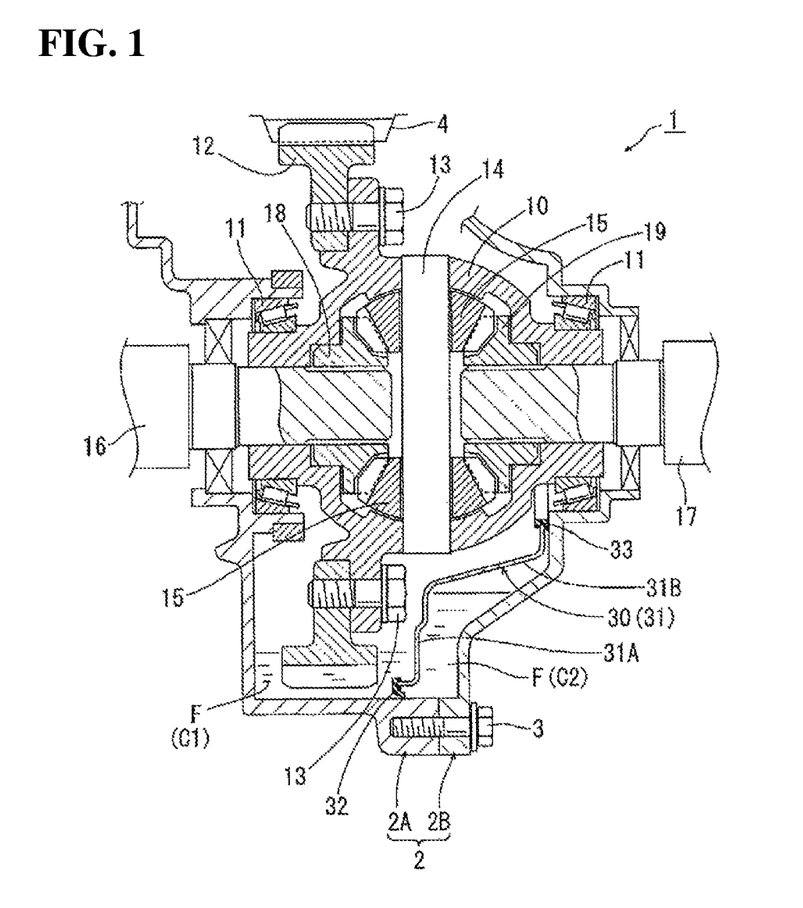
FIG. 1 is a side cross-sectional view showing one example of a differential device wherein a baffle plate is used according to the first embodiment of the present invention.

In FIG. 1, a differential device 1 according to the first embodiment of the present invention is integrally provided relative to a transmission (omitted in the drawings) in a vehicle (an automobile) which is a front wheel drive. Namely, in the present embodiment, a differential case 2 forming an outer shell of the differential device 1 is formed by a case main member 2A integrally formed with a transmission case, and a cover case 2B connected to the case main member 2A by a bolt 3.

Inside the differential case 2, there is rotatably housed a holding case 10 through a bearing 11. In the holding case 10, there is fixed a ring gear 12 as an input gear by bolts 13. There is engaged a final output gear 4 of the transmission relative to the ring gear 12.

In the holding case 10, there is held a pinion shaft 14, and in the pinion shaft 14, there is rotatably held a pinion gear 15. Also, in the holding case 10, there are rotatably held respective vehicle-width-direction inner end portions of right and left drive shafts 16 and 17. Right and left side gears 18 and 19 provided in such a way as to integrally rotate relative to the drive shafts 16 and 17 are engaged relative to the aforementioned pinion gear 15. A differential function itself of the differential device 1 formed as above is well-known so as to omit an explanation hereinafter.

Inside the differential case 2, there is reserved a lubricating oil F. In a stationary state wherein the ring gear 12 does not rotate, an oil level of the lubricating oil F is positioned higher than the lowermost portion of the ring gear 12 only at a predetermined portion. Thereby, when the ring gear 12 rotates, the ring gear 12 scoops up the lubricating oil F, so that each gear, a rotation support portion thereof, and the like inside the differential device 1 are lubricated.

Inside the differential case 2, at a lateral side (a right side of the ring gear 12 in FIG. 1) of one side of the ring gear 12, there is disposed a baffle plate 30. The baffle plate 30 divides a lower portion (a portion lower than an approximately axis position of the drive shafts 16 and 17) inside the differential case 2 into a first chamber C1 where the ring gear 12 is positioned, and a second chamber C2 which is positioned on a side opposite to the ring gear 12 by sandwiching the baffle plate 30. Then, the first chamber C1 and the second chamber C2 are communicated with each other through an upper space thereof.

Figure 3:
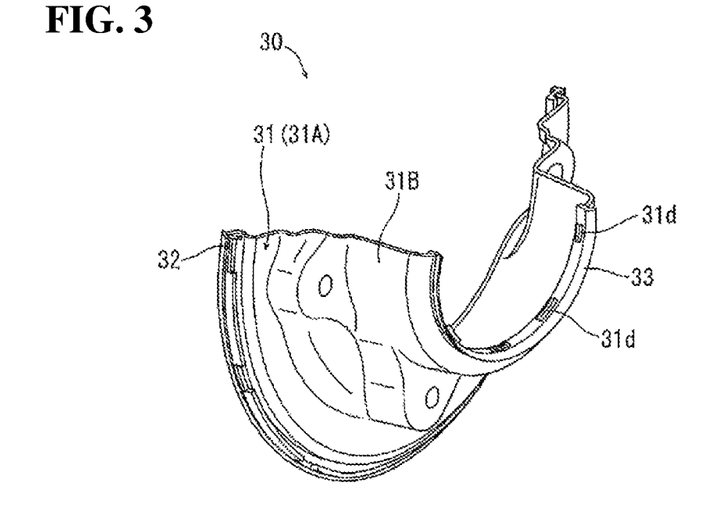
FIG. 3 is a perspective view of the baffle plate.
Figure 4:
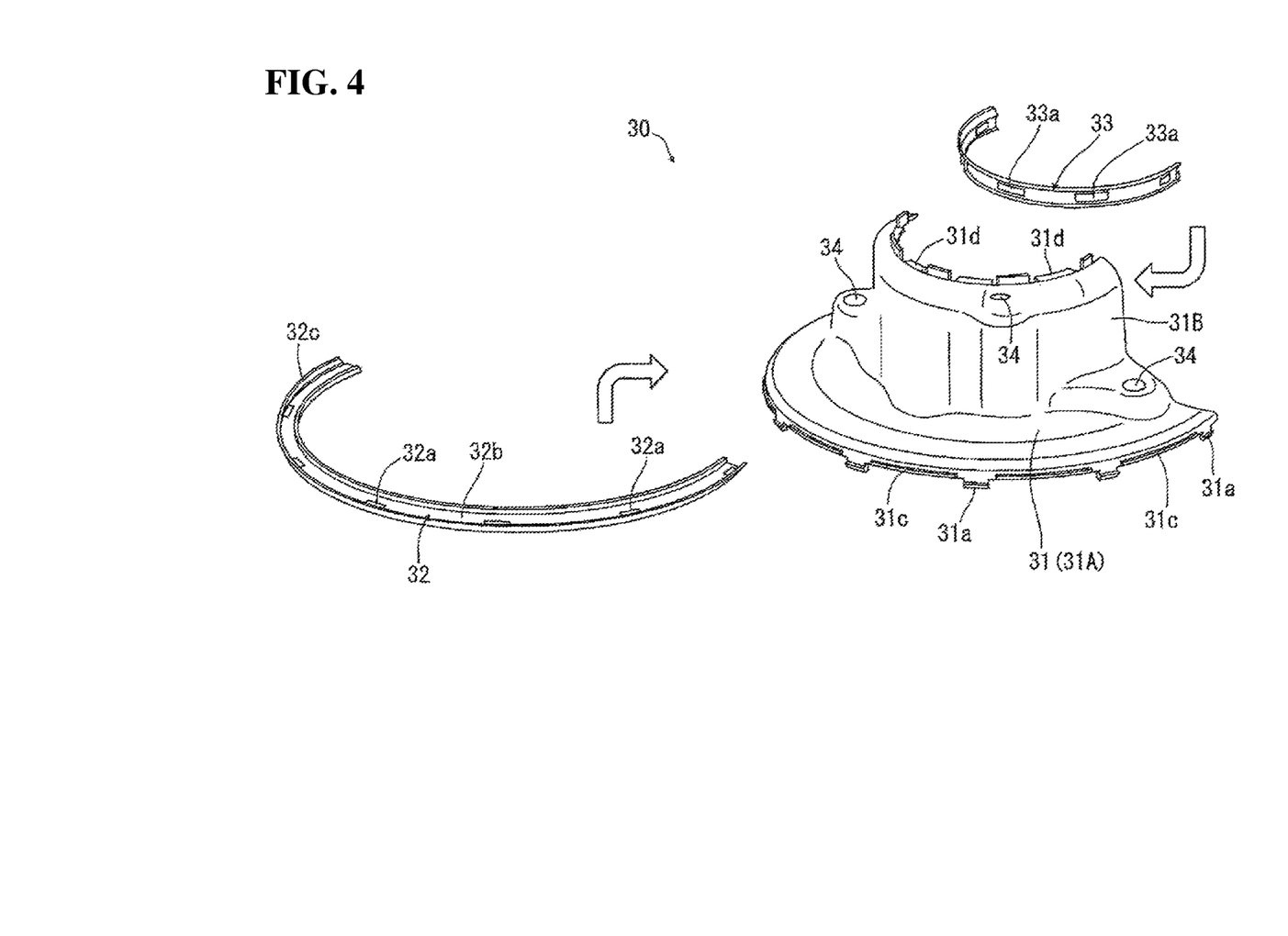
FIG. 4 is a disassembled perspective view of the baffle plate.

The baffle plate 30 is an assembly member of a baffle plate main member 31 made of synthetic resin (hard synthetic resin in the present embodiment); a first seal member 32 attached to the baffle plate main member 31; and a second seal member 33. Each seal member 32 and 33 is made of elastically deformable synthetic resin.

The baffle plate main member 31 includes a radial-direction wall portion 31A extending in a radial direction of the ring gear 12, and a halved cylindrical portion 31B having an approximately half cylindrical shape (an upper portion is open) extending in an axial direction of the drive shafts 16 and 17 from an upper edge portion of the radial-direction wall portion 31A. An outer peripheral edge portion of the radial-direction wall portion 31A is formed in an arc shape around a shaft center of the ring gear 12 (see FIG. 2, FIG. 5, and the like). Corresponding to this, a bottom wall portion inner face of the differential case 2 is formed in an arc shape around the shaft center of the ring gear 12 as well. Then, in an outer peripheral edge portion (the outer peripheral edge portion of the radial-direction wall portion 31A) of the baffle plate main member 31 extending in the arc shape, there is attached the first seal member 32 having the arc shape in the later-described manner. The first chamber C1 and the second chamber C2 are sealed by the first seal member 32. Incidentally, at an attachment portion between the baffle plate main member 31 and the first seal member 32, there is formed a slight gap which becomes the later-described return passage.

Figure 9:
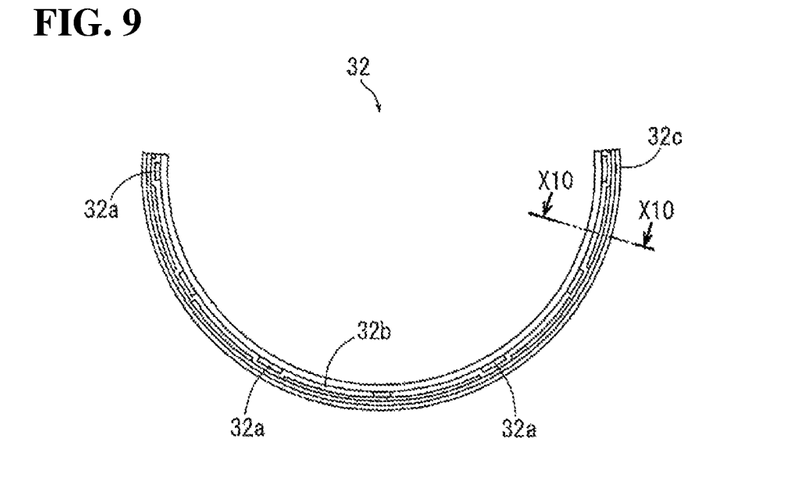
FIG. 9 is a plan view showing a seal member attached to an outer peripheral edge portion of the baffle plate main member.
Figure 14:
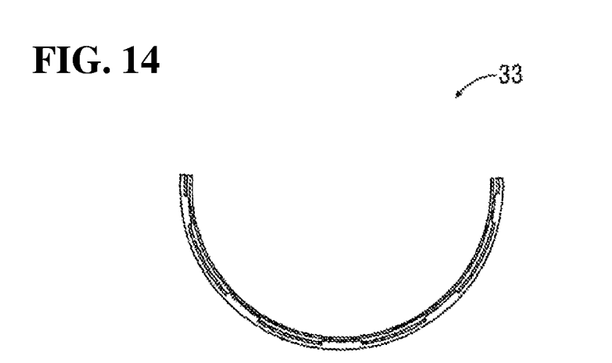
FIG. 14 is a plan view showing another seal member attached to an inner peripheral edge portion of the baffle plate.

The aforementioned halved cylindrical portion 31B extends in a direction of separating from the ring gear 12 from the radial-direction wall portion 31A, and is disposed along a lower face of the holding case 10. A bottom wall portion of the halved cylindrical portion 31B is formed in such a way as to slightly incline to be gradually lowered toward the ring gear 12. Then, at a tip portion (i.e. an inner peripheral edge portion of the baffle plate main member 31) of the halved cylindrical portion 31B, there is attached the aforementioned second seal member 33 in the later-described manner. The second seal member 33 contacts the cover case 2B so as to seal between a tip of the halved cylindrical portion 31B and the cover case 2B. Each seal member 32 and 33 is formed in an arc shape around the shaft center of the ring gear 12 (see FIG. 4, FIG. 9, and FIG. 14).

Figure 5:
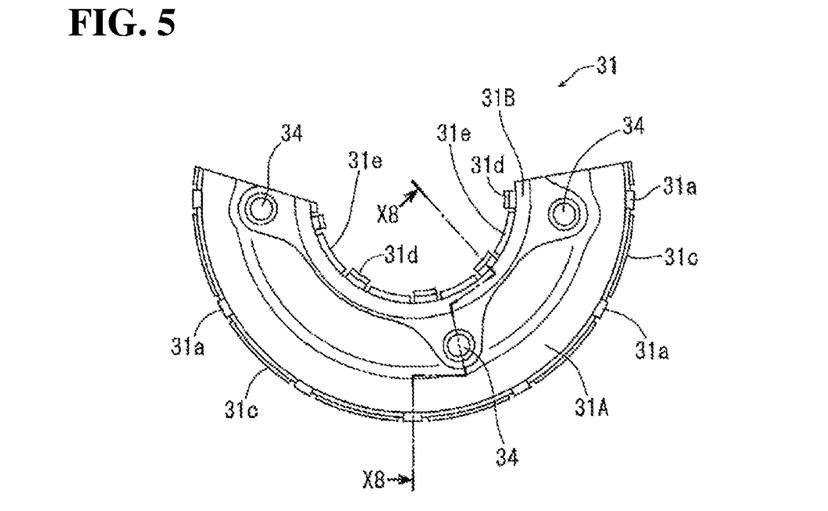
FIG. 5 is a front view wherein a baffle plate main member is viewed from a ring gear side.

In the baffle plate main member 31 (the radial-direction wall portion 31A), there is formed a plurality of attachment holes 34 (see FIG. 4, FIG. 5, and the like). The baffle plate 31 is fixed to the cover case 2B by fixtures 35 (see FIG. 2) such as a bolt and the like inserted to pass through the attachment holes 34.

In the structure as described above, in the stationary state wherein the ring gear 12 does not rotate, the lubricating oil F inside the differential case 2 has a high oil level (a sufficient amount of lubricating oil F is reserved inside the differential case 2). Since the first chamber C1 and the second chamber C2 are communicated by the later-described slight gap (return passage) formed at the attachment portion between the baffle plate main member 31 and the first seal member 32, when the stationary state continues, oil levels in the first chamber C1 and the second chamber C2 become the same.

When the ring gear 12 rotates, the lubricating oil F inside the first chamber C1 is scooped up by the ring gear 12, and each gear, the rotation support portion thereof, and the like are lubricated. The scooped lubricating oil F partially falls into the second chamber C2 through the upper space of each chamber C1 and C2. Thus, the lubricating oil F moves from the first chamber C1 to the second chamber C2, and while the oil level in the second chamber C2 is raised, the oil level in the first chamber C1 is lowered. Since the oil level in the first chamber C1 is lowered, a resistance of the lubricating oil when the ring gear 12 rotates becomes smaller so as to improve fuel efficiency. Also, foaming of the lubricating oil F is reduced by the baffle plate 30 as well.

A rise of the oil level in the second chamber C2 is controlled at a minimum height position of the baffle plate main member 31 so as to prevent the oil level in the second chamber C2 from rising more than necessary, i.e. the oil level in the first chamber C1 from lowering more than necessary. Also, above the halved cylindrical portion 31B, there are positioned the pinion gear 15, the side gears 18 and 19, and the like where lubrication is required; however, the lubricating oil after lubricating those is returned to the first chamber C1 after falling into the halved cylindrical portion 31B so as to prevent the lubricating oil from moving to the second chamber C2 more than necessary.

In a state wherein the oil level in the second chamber C2 becomes higher than the oil level in the first chamber C1, if the stationary state wherein the ring gear 12 halts the rotation continues, the lubricating oil F slowly flows (returns) from the second chamber C2 to the first chamber C1 through the aforementioned slight gap, and finally, returns such that the oil levels in the first chamber C1 and the second chamber C2 become the same.

Next, an attachment example of the baffle plate main member 31 and the first seal member 32 will be explained. First, the first seal member 32 is made of the elastically deformable synthetic resin, and formed in the arc shape as a whole. Then, there is formed a plurality of fitting holes 32a at intervals in a longitudinal direction (circumferential direction) thereof (see FIG. 4 and FIG. 9).

Figure 6:
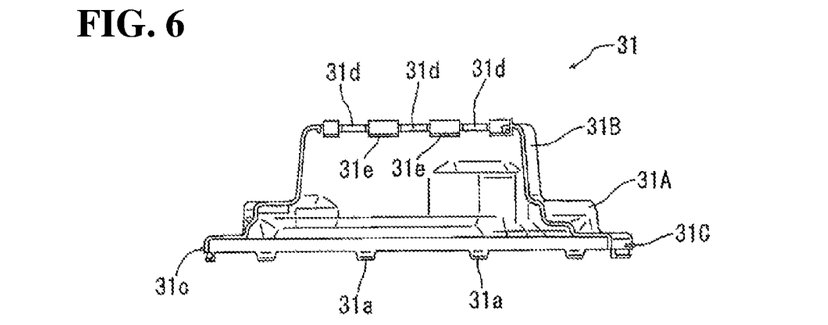
FIG. 6 is a top view of FIG. 1.
Figure 7:
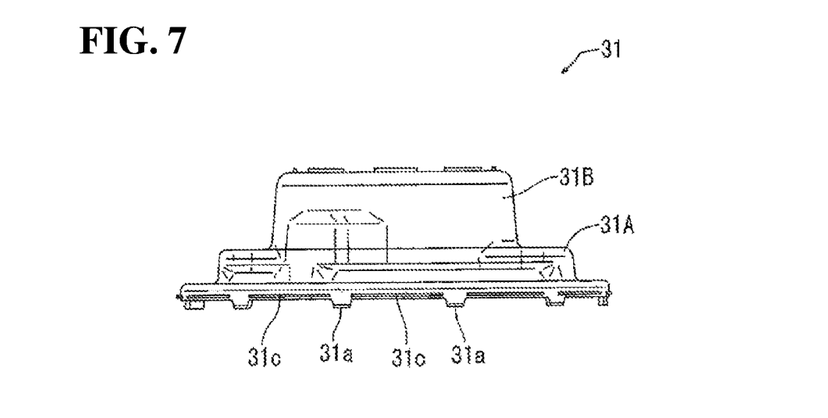
FIG. 7 is a bottom view of FIG. 1.
Figure 8:
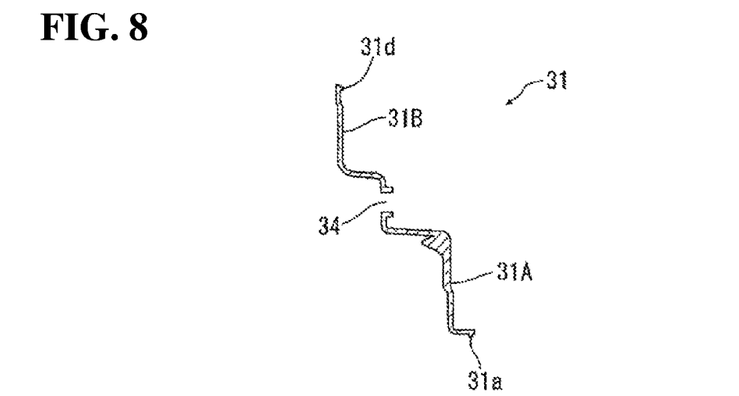
FIG. 8 is a cross-sectional view taken along a line X8-X8 in FIG. 5.

On the other hand, in the outer peripheral edge portion of the baffle plate main member 31 (the radial-direction wall portion 31A), there is formed a plurality of locking claw portions 31a at intervals in a circumferential direction thereof (see FIG. 4, FIG. 5, and FIG. 6). The locking claw portions 31a can elastically deform slightly, and the locking claw portions 31a fit into the fitting holes 32a of the first seal member 32, and is locked, so that the first seal member 32 is attached to the baffle plate main member 31 (integrally, see FIG. 12).

Figure 13:
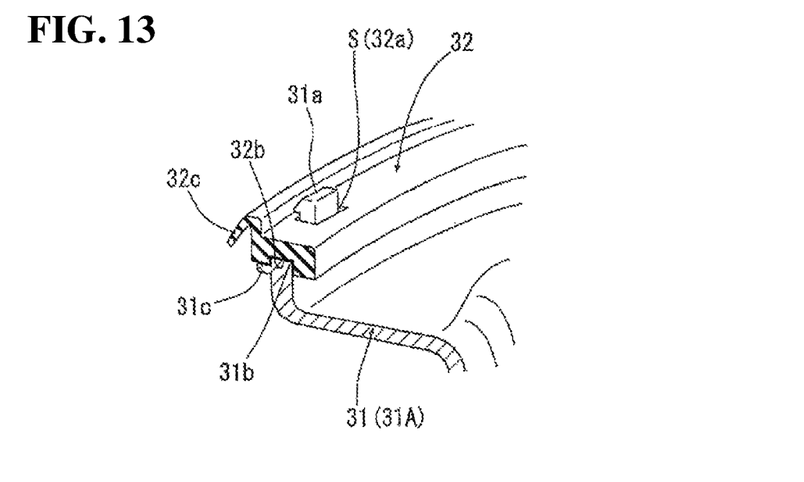
FIG. 13 is a perspective view showing the assembly state between the baffle plate main member and the seal member, and an engagement state between the fitting hole and a locking claw portion.

A length in the circumferential direction of the aforementioned fitting hole 32a is formed slightly longer than a length in the circumferential direction of the locking claw portion 31a. Namely, in a state wherein the locking claw portion 31a fits (engages) relative to the fitting hole 32a, there is formed a slight gap S (see FIG. 13) in the circumferential direction of the locking claw portion 31a, and the gap S becomes the return passage for returning the lubricating oil from the second chamber C2 to the first chamber C1. It is set such that an amount of the lubricating oil flowing from the second chamber C2 to the first chamber C1 through the gap S becomes fewer compared to an amount of the lubricating oil moving from the first chamber C1 to the second chamber C2 when the ring gear 12 rotates. Incidentally, it is sufficient that such gap S is formed at a fitting portion between the fitting hole 32a located at a low position and the locking claw portion 31a.

Figure 11:
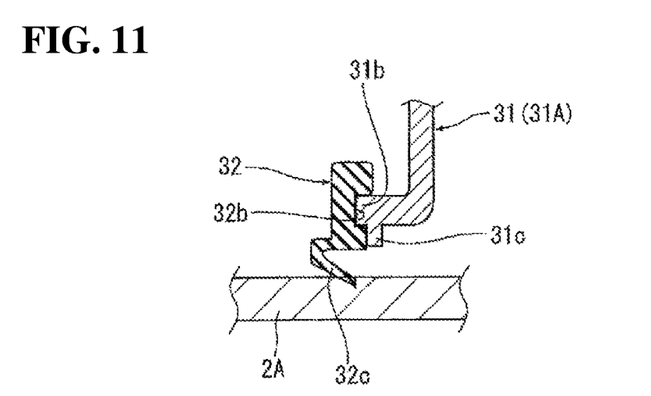
FIG. 11 is a cross-sectional view showing an attachment state in which the seal member is attached to the baffle plate main member and a contacting state in which the seal member is contacting the differential case, at a portion other than a fitting hole.

As shown in FIG. 11, on a back face side of the first seal member 32, there is formed a concave groove 32b extending in the circumferential direction. Corresponding to the concave groove 32b, in the baffle plate main member 31, there is formed a convex piece portion 31b fitting into the concave groove 32b without wobbling. The convex piece portion 31b fits into the concave groove 32b so as to prevent a situation that the first seal member 32 improperly falls to be deformed. Incidentally, in the baffle plate main member 31, there is formed a plurality of supporting projecting portions 31c abutting against a back face of the first seal member 32 (see FIG. 5 and FIG. 11) so as to reliably prevent the first seal member 32 from falling further.

Figure 10:
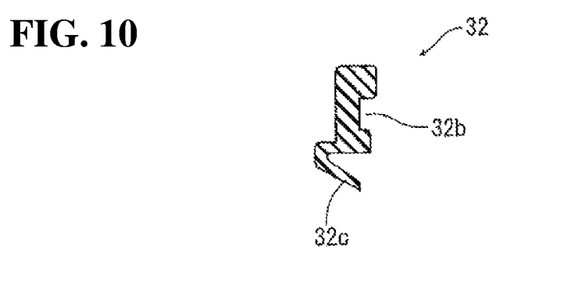
FIG. 10 is a cross-sectional view taken along a line X10-X10 in FIG. 9.
Figure 12:
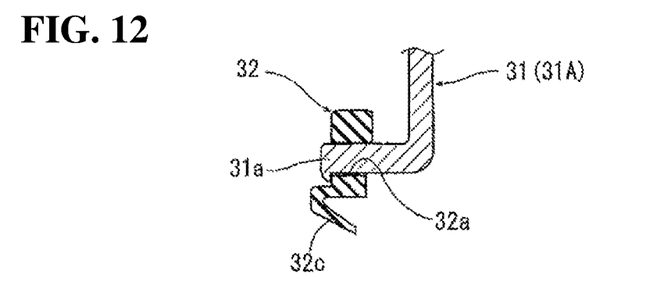
FIG. 12 is a cross-sectional view showing an assembly state between the baffle plate main member and the seal member at a fitting hole portion.

The first seal member 32 includes a lip portion 32c at a tip portion thereof (see FIG. 10 to FIG. 12). The lip portion 32c inclines in a direction of separating from the ring gear 12 as moving to an outer side in the radial direction of the ring gear 12. Namely, the inclination setting is set to be preferable for preventing the lubricating oil F from flowing in a direction toward the first chamber C1 from the second chamber C2. Also, when an oil pressure in the first chamber C1 becomes high accompanied by the rotation of the ring gear 12, the inclination setting is set in a direction of parrying the high oil pressure so as to be preferable for preventing the first seal member 32 from falling as well. Moreover, the inclination setting is set such that a sliding resistance toward a side heading for the ring gear 12 becomes smaller.

Figure 2:
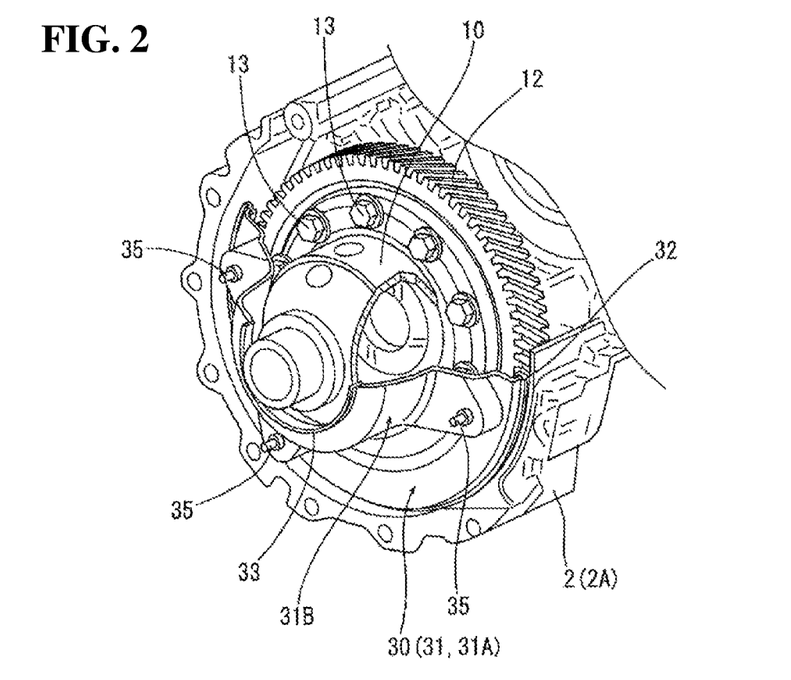
FIG. 2 is a disassembled perspective view showing an assembly relationship among the baffle plate, a ring gear, and a differential case.

The baffle plate 30 is fixed to the cover case 2B in advance using the fixtures 35 shown in FIG. 2. After that, the cover case 2B is fixed to the case main member 2A by the bolt 3 while approaching the case main member 2A. When the cover case 2B approaches the case main member 2A, the first seal member 32 is inserted into the case main member 2A in such a way as to slide an inner face of the case main member 2A; however, due to the inclination setting of the lip portion 32c, the first seal member 32 is inserted into the case main member 2A without accompanying a large sliding resistance by the lip portion 32c.

Figure 15:
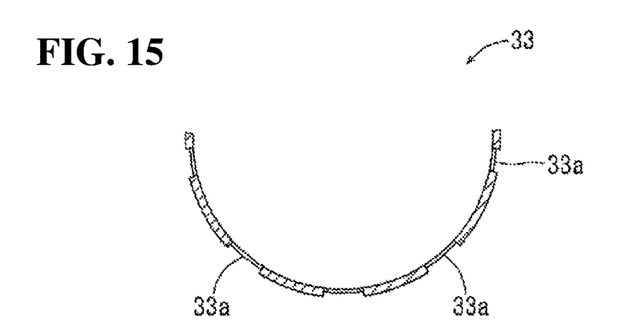
FIG. 15 is a cross-sectional view taken along a center portion in a width direction of another seal member shown in FIG. 14.

Next, an attachment example of the baffle plate main member 31 and the second seal member 33 will be explained. First, in the second seal member 33, there is formed a plurality of fitting holes 33a at intervals in a longitudinal direction thereof (see FIG. 4, FIG. 15, and FIG. 17). Also, in the baffle plate main member 31 (a tip portion of the halved cylindrical portion 31B), there is formed a plurality of locking claw portions 31d at intervals in the circumferential direction (see FIG. 4, FIG. 5, and FIG. 6). The locking claw portions 31d are slightly elastically deformable, and the locking claw portions 31d fit into the fitting holes 33a of the second seal member 33 to be locked, so that the second seal member 33 is attached to the baffle plate main member 31 (integrally, see FIG. 17).

Figure 16:
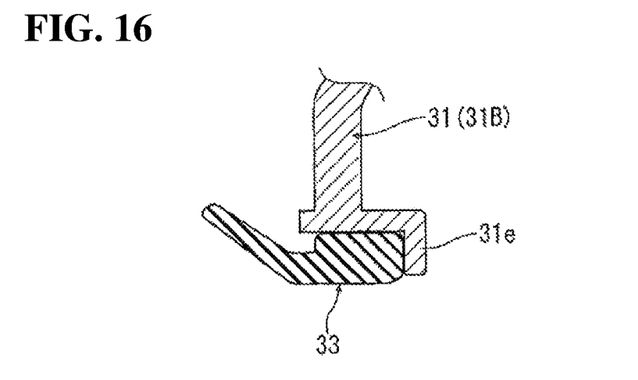
FIG. 16 is a cross-sectional view showing an assembly state between the baffle plate main member and another seal member at a portion other than the fitting hole.
Figure 17:
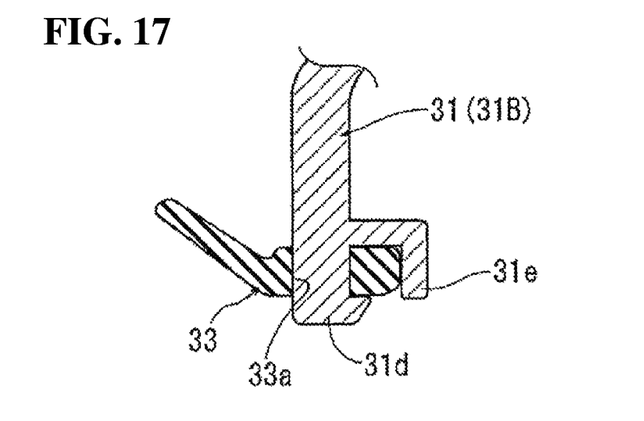
FIG. 17 is a cross-sectional view showing the assembly state between the baffle plate main member and another seal member at the fitting hole portion.

In the baffle plate main member 31, there are formed supporting projecting portions 31e abutting against a back face of the second seal member 33 (see FIG. 5, FIG. 16, and FIG. 17). Thereby, falling deformation of the second seal member 33 is prevented. The second seal member 33 extends in the direction of separating from the ring gear 12 as moving to a tip, and is set in such a way as to gradually incline in a direction toward the outer side in the radial direction of the ring gear 12 as separating from the ring gear 12. Thereby, the inclination setting is set to be preferable for reliably preventing a flow of the lubricating oil F flowing upward along an inner face of the cover case 2B from the second chamber C2.

The embodiment has been explained hereinabove; however, the present invention is not limited to the present embodiment, and can be appropriately changed within the scope of claims of the present invention. For example, the following cases are included as well. The locking claw portions may be formed in the seal member 32 or 33, and the fitting holes may be formed in the baffle plate main member 31. The differential device 1 may be for a rear wheel drive as well. The return passage for returning the lubricating oil from the second chamber C2 to the first chamber C1 may not be formed using the gap S between the fitting hole 32a and the locking claw portion 31a, and may be formed by a dedicated returning hole formed at a low portion of the baffle plate main member 31.

The baffle plate main member 31 and each seal member 32 and 33 are discretely independently molded by, for example, injection molding, and after being taken out of a die respectively, the baffle plate main member 31, and each seal member 32 and 33 can be attached using the fitting holes and the locking claw portions (integrated later). Separately from this, molding of the baffle plate main member 31, molding of the seal members 32 and 33, and an integration of the seal members 32 and 33 relative to the baffle plate main member 31 may be carried out by two-color molding (double molding) generally carried out in the injection molding at once within the same die. In a case of the two-color molding, when there is a relationship wherein the baffle plate main member 31 and the seal members 32 and 33 are not fused, the fitting holes and the locking claw portions fitted into the fitting holes are matched to be molded so as to become preferable for reliably integrating. Obviously, the object of the present invention is not limited to the above, and implicitly includes objects which are described as being substantially preferable or advantageous.

INDUSTRIAL APPLICABILITY

The baffle plate according to the present invention is incorporated in the differential device so as to become preferable for reducing a scooping-up resistance of the lubricating oil and the like.

EXPLANATION OF SYMBOLS

1: a differential device
2: a differential case
2A: a case main member
2B: a cover case
3: bolts
10: a holding case
12: a ring gear
14: a pinion shaft
15: a pinion gear
16, 17: drive shafts
18, 19: side gears
30: a baffle plate
31: a baffle plate main member
31A: a radial-direction wall portion
31B: a halved cylindrical portion
31a: locking claw portions
31b: a convex piece portion
31c: supporting projecting portions
31d: locking claw portions
31e: supporting projecting portions
32: a first seal member
32a: fitting holes
32b: a concave groove
32c: a lip portion
33: a second seal member
33a: fitting holes
34: attachment holes
35: fixtures

What is claimed is:
1. A baffle plate for a differential device disposed inside a differential case, comprising:

a baffle plate main member made of synthetic resin and adapted to be disposed on one lateral side of a ring gear in the differential device; and an elastically deformable seal member attached to an outer peripheral edge portion of the baffle plate main member and adapted to contact a bottom wall portion of the differential case.

2. A baffle plate for a differential device according to claim 1, wherein the seal member is made of elastically deformable synthetic resin.

3. A baffle plate for a differential device according to claim 1, wherein a fitting hole is formed in one of the outer peripheral edge portion of the baffle plate main member or the seal member, and a locking claw portion engaging the fitting hole is formed in the other, and the locking claw portion fits into the fitting hole so that the baffle plate main member and the seal member are integrated.

4. A baffle plate for a differential device according to claim 3, wherein the locking claw portion is elastically deformable.

5. A baffle plate for a differential device according to claim 1, wherein the seal member is formed with a concave groove into which the outer peripheral edge portion of the baffle plate main member fits.

6. A baffle plate for a differential device according to claim 1, wherein the seal member includes a lip portion, and an extending direction of a tip portion of the lip portion is set in a direction opposite to the ring gear.

7. A baffle plate for a differential device according to claim 1, wherein the baffle plate main member includes a radial-direction wall portion disposed along a radial direction of the ring gear; and a halved cylindrical portion extending in an axial direction of the ring gear from an inner peripheral edge portion of the radial-direction wall portion, and a tip portion of the halved cylindrical portion is attached with another seal member for contacting an inner face of the differential case.

8. A baffle plate for a differential device according to claim 1, wherein the baffle plate main member and the seal member are formed by injection molding with two-color molding.

* * * * *